(12) United States Patent
Matsuoka

(10) Patent No.: US 7,678,498 B2
(45) Date of Patent: Mar. 16, 2010

(54) NONAQUEOUS ELECTROLYTE SECONDARY BATTERY

(75) Inventor: Ryutaro Matsuoka, Fukushima (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 12/032,815

(22) Filed: Feb. 18, 2008

(65) Prior Publication Data

US 2008/0206633 A1    Aug. 28, 2008

(30) Foreign Application Priority Data

Feb. 26, 2007    (JP) ............................ P2007-045431

(51) Int. Cl.
*H01M 2/02*    (2006.01)
*H01M 10/36*   (2010.01)

(52) U.S. Cl. ........................ 429/164; 429/57
(58) Field of Classification Search .................. 429/164
See application file for complete search history.

(56) References Cited

U.S. PATENT DOCUMENTS 5,707,756 A * 1/1998 Inoue et al. .................... 429/57
6,136,464 A * 10/2000 Wakabe et al. ................. 429/53

FOREIGN PATENT DOCUMENTS

| JP | 270137 | 10/1997 |
|----|--------|---------|
| JP | 2001-307706 | 11/2001 |
| JP | 2001-325942 | 11/2001 |
| JP | 2003007277 A * | 1/2003 |
| JP | 3555240 | 5/2004 |

* cited by examiner

*Primary Examiner*—Patrick Ryan
*Assistant Examiner*—Brent Thomas
(74) *Attorney, Agent, or Firm*—K&L Gates LLP

(57) ABSTRACT

A nonaqueous electrolyte secondary battery includes a battery can container which houses a wound electrode body formed by winding a belt-shaped anode and cathode isolated by a separator together with an electrolytic solution, an anode terminal fixed to the battery can container through a gasket, and a safety valve incorporated between the anode terminal and the wound electrode body. The safety valve includes a safety cover annularly formed, a stripper disk annularly formed, and a disk holder, annularly formed, which houses the stripper disk in the safety cover to fix and integrate the safety cover and the stripper disk therewith.

11 Claims, 7 Drawing Sheets

NONAQUEOUS ELECTROLYTE SECONDARY BATTERY

CROSS REFERENCES TO RELATED APPLICATIONS

The present application claims priority to Japanese Patent Application No. 2007-45431 filed in the Japanese Patent Office on Feb. 26, 2007, the entire contents of which are incorporated herein by reference.

BACKGROUND

The present application relates to a nonaqueous electrolyte secondary battery, and more particularly to a nonaqueous electrolyte secondary battery with a safety valve (safety mechanism), more specifically a safety cover.

As one example, a nonaqueous electrolyte secondary battery is known in which a safety valve 50 is constructed as shown in FIG. 8. A disk holder 53 similar in shape to a safety cover 51 is put over the safety cover 52 such that a protrusion 52 of the safety cover 51 is contained therein, and a stripper disk 54 similar in shape to the disk holder 53 is put over the disk holder 53 such that the disk holder 53 is contained therein (see, e.g., Japanese Unexamined Patent Application Publication No. 2001-307706 (hereinafter referred to as "Patent Document 1")).

As other examples of nonaqueous electrolyte secondary batteries, batteries constructed similarly to the example shown in FIG. 8 are known (see, for example, Japanese Patent Publication Nos. 2701375 and 3555240 (hereinafter referred to as "Patent Documents 2" and "Patent Document 3", respectively), and Japanese Unexamined Patent Application Publication No. 2001-325942 (hereinafter referred to as "Patent Document 4")).

However, in each of the known nonaqueous electrolyte secondary batteries disclosed in the Patent Documents 1, 2, 3, and 4, the safety cover, the disk holder, and the stripper disk are stacked. Thus a height between an upper surface of the safety cover and a lower surface of the stripper disk is so large that this stacked body juts into an internal space of the battery, thereby reducing the internal volume and thus making it likely to preclude a higher battery capacity.

SUMMARY

In view of the above circumstance, it is desirable to provide a nonaqueous electrolyte secondary battery which can provide a higher battery capacity by reducing the height between the upper surface of the safety cover and the lower surface of the stripper disk to increase the internal capacity of the battery without changing the total height of the battery.

In accordance with an embodiment, there is provided a nonaqueous electrolyte secondary battery including a battery can container which houses a wound electrode body formed by winding a belt-shaped anode and cathode, and isolated by a separator together with an electrolytic solution, an anode terminal fixed to the battery can container through a gasket, and a safety valve incorporated between the anode terminal and the wound electrode body. The safety valve includes an annular-shaped safety cover, an annular-shaped stripper disk, and an annular-shaped disk holder which houses the annular-shaped safety cover and the annular-shaped stripper disk, so that the annular-shaped disk holder and the annular-shaped stripper disk is fixed and integrated.

According to the nonaqueous electrolyte secondary battery having the above construction in an embodiment, the safety valve is molded by housing the annular-shaped stripper disk in the annular-shaped safety cover, and by fixing and integrating the stripper disk with the annular-shaped disk holder. As a result, the stripper disk is fit into a height of the safety, cover, so that the height between the upper surface of the safety cover and the lower surface of the stripper disk is decreased to increase the internal volume of the battery without changing the total height, thereby providing a higher capacity of the battery.

Furthermore, the safety cover may be formed with an annular-shaped protrusion for housing the disk holder therein, and the protrusion may have a disconnection preventing portion formed for preventing disconnection of the disk holder.

According to the nonaqueous electrolyte secondary battery as described above in an embodiment, if the disk holder is molded in a manner fitting the disk holder into the disconnection preventing portion of the protrusion of the safety cover, the disk holder may be temporarily fixed during integral molding of the disk holder with the safety cover, allowing the disk holder to be integrally molded accurately without causing the disk holder positioned by the disconnection preventing portion from deviating from its position.

Furthermore, the safety cover may be further formed an outside inscription for controlling a cleaving pressure and an inside inscription for controlling a breaking pressure according to an embodiment.

According to the nonaqueous electrolyte secondary battery as described above in an embodiment, if the nonaqueous electrolyte secondary battery is overcharged, or short-circuited due to erroneous use to cause a large current to flow, the cleaving pressure can be controlled by the safety cover being deformed or cut through the outside inscription, and the breaking pressure can be controlled by the safety cover being deformed through the inner inscription, when the electrolytic solution is dissolved to produce a gas to increase an internal pressure in the battery can container.

Furthermore, the above-described disk holder may be formed by outsert-molding a thermoplastic resin in an embodiment. A basic concept of this technique is to insert a board (metal plate) being a base, between mold dies and provide any necessary mechanism/functional component or the like through a single injection molding operation on the thermoplastic resin.

According to the nonaqueous electrolyte secondary battery as described above in an embodiment, the disk holder fixes the stripper disk to the safety cover by outsert-molding the thermoplastic resin with the stripper disk housed in the safety cover. As a result, the disk holder can fix the safety cover and the stripper disk with their dimensional errors absorbed.

Furthermore, the thermoplastic resin for the above-disclosed disk holder may be any one of polypropylene (PP), polystyrene (PS), polyethylene (PE), and polyethylene terephthalate (PET) according to an embodiment.

According to the nonaqueous electrolyte secondary battery as described above in an embodiment, easy molding can be performed using an insulating, relatively inexpensive resin material since any of polypropylene (PP), polystyrene (PS), polyethylene (PE), and polyethylene terephthalate (PET) is used as the thermoplastic resin for the disk holder.

According to the nonaqueous electrolyte secondary battery as described above in an embodiment, a nonaqueous electrolyte secondary battery is provided which can achieve a higher capacity of the battery by increasing the internal volume of the battery.

Additional features and advantages are described herein, and will be apparent from the following Detailed Description and the figures.

DETAILED DESCRIPTION

Embodiments of the present application will now be described in greater detail below with reference to FIGS. 1 through 7.

Figure 1:
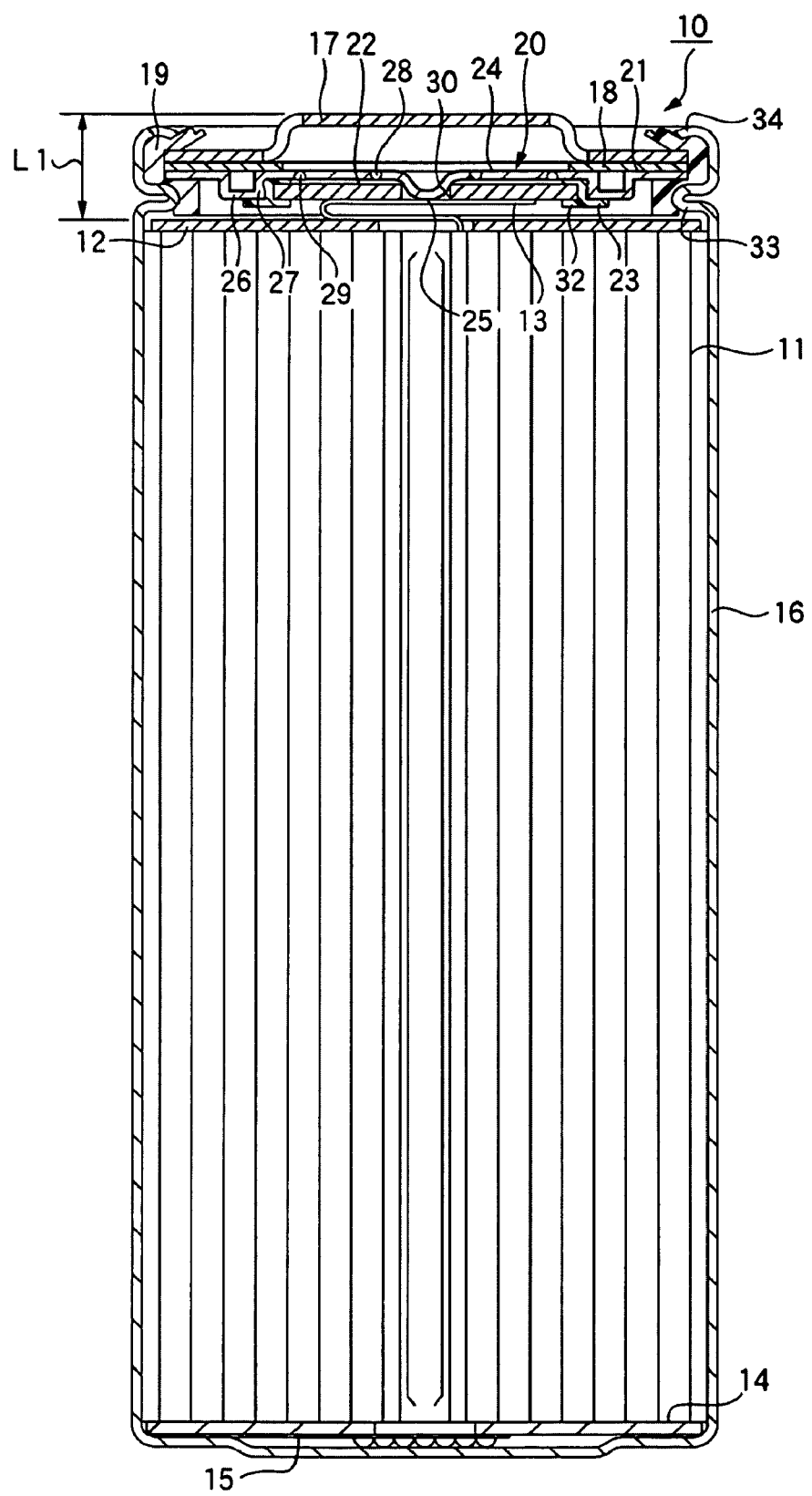
FIG. 1 is a sectional view of a nonaqueous electrolyte secondary battery according to an embodiment.
Figure 2A:
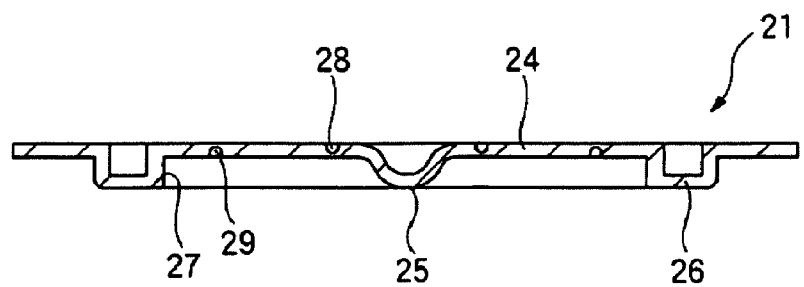
FIG. 2A is a sectional view showing only a safety cover used for the nonaqueous electrolyte secondary battery shown in FIG. 1.
Figure 2B:
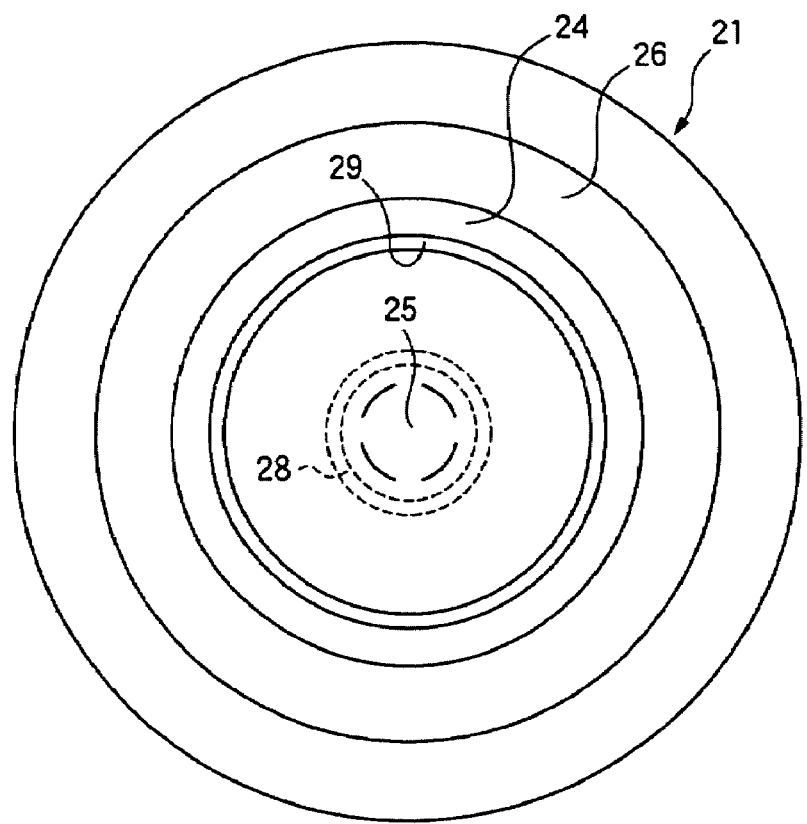
FIG. 2B is a bottom view of FIG. 2A.
Figure 3A:
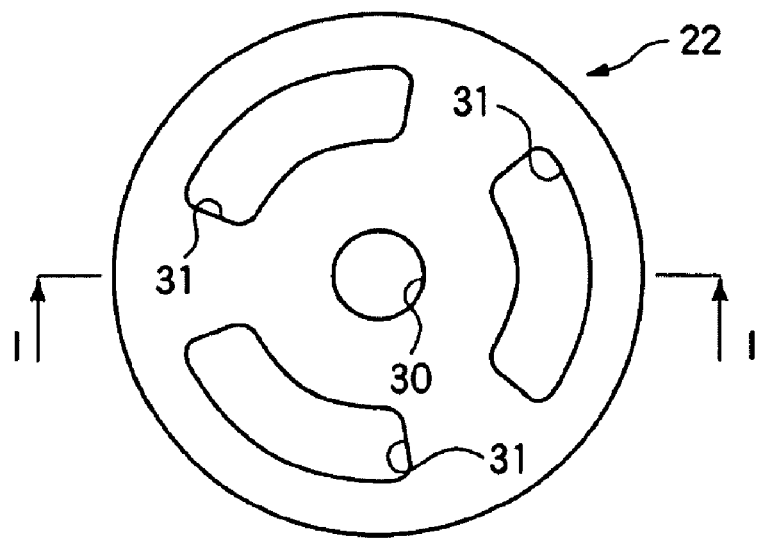
FIG. 3A is a plan view showing only a stripper disk used for the nonaqueous electrolyte secondary battery shown in FIG. 1.
Figure 3B:
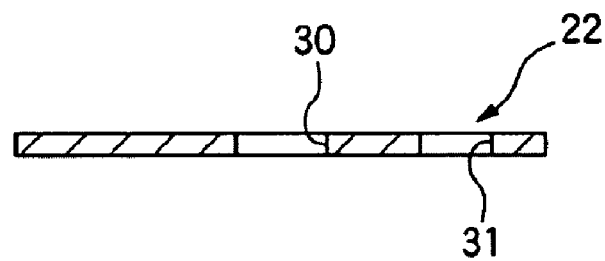
FIG. 3B is a sectional view taken along a line I-I of FIG. 3A.
Figure 4A:
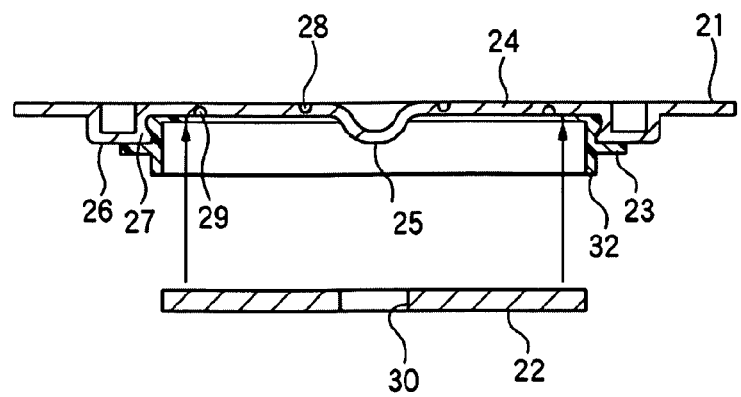
FIGS. 4A to 4C are partially cutaway sectional views for illustrating an assembling procedure for the nonaqueous electrolyte secondary battery shown in FIG. 1.
Figure 4B:
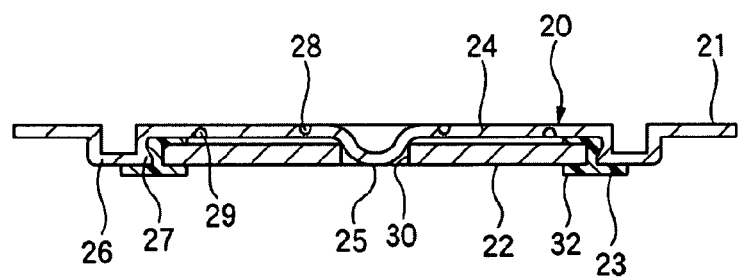
Figure 4C:
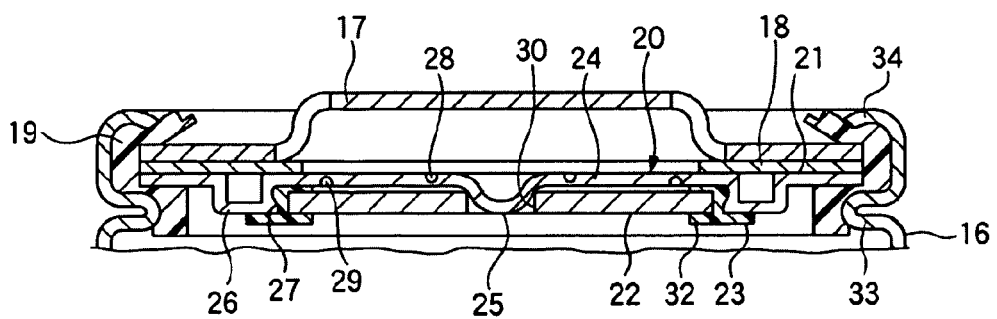
Figure 5A:
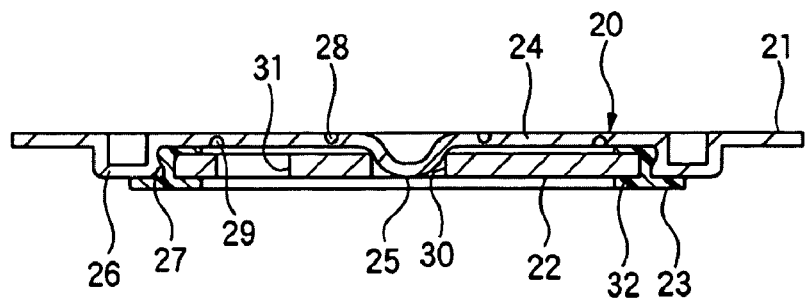
FIG. 5A is a sectional view of a safety valve in the nonaqueous electrolyte secondary battery shown in FIG. 1.
Figure 5B:
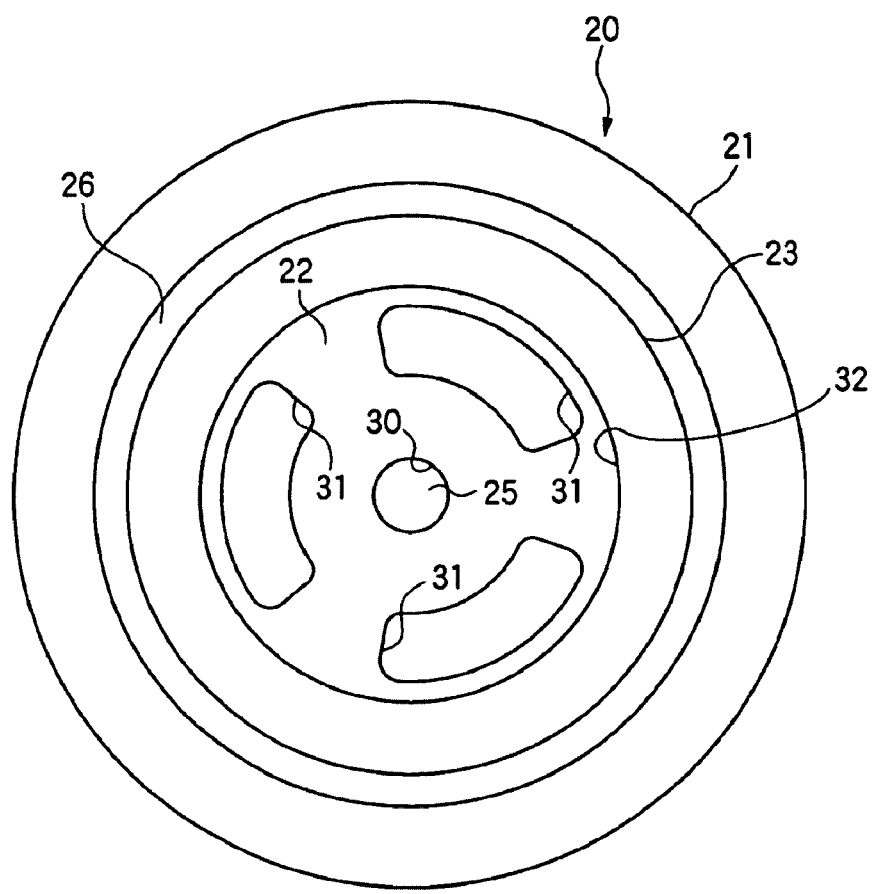
FIG. 5B is a bottom view of FIG. 5A.
Figure 6:
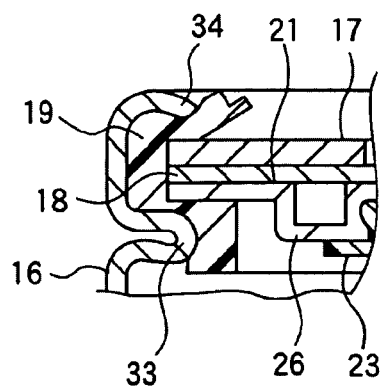
FIG. 6 is a partially cutaway sectional view of a packaging can in the nonaqueous electrolyte secondary battery shown in FIG. 1.
Figure 7:
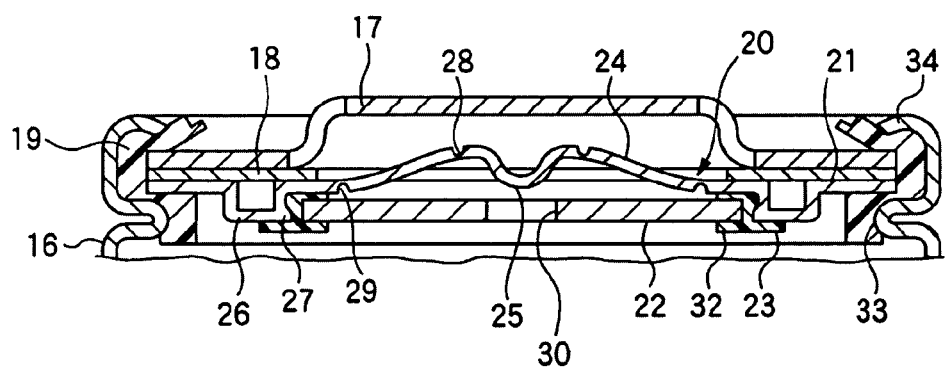
FIG. 7 is a sectional view of a peripheral portion of the safety valve for illustrating an operation of the nonaqueous electrolyte secondary battery shown in FIG. 1.
Figure 8:
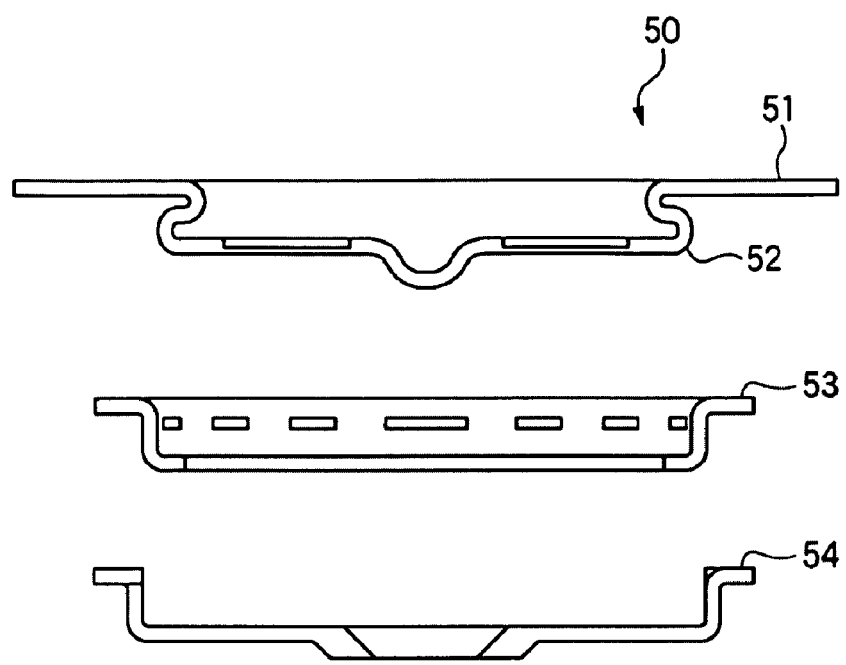

FIG. 1 is a sectional view of a nonaqueous electrolyte secondary battery according to an embodiment; FIG. 2A is a sectional view showing a safety cover component used for the nonaqueous electrolyte secondary battery shown in FIG. 1; FIG. 2B is a bottom view of FIG. 2A; FIG. 3A is a plan view showing only a stripper disk used for the nonaqueous electrolyte secondary battery shown in FIG. 1; FIG. 3B is a sectional view taken along a line I-I of FIG. 3A; FIGS. 4A to 4C are partially cutaway sectional views for illustrating an assembling procedure for the nonaqueous electrolyte secondary battery shown in FIG. 1; FIG. 5A is a sectional view of a safety valve in the nonaqueous electrolyte secondary battery shown in FIG. 1; FIG. 5B is a bottom view of FIG. 5A; FIG. 6 is a partially cutaway sectional view of a packaging can in the nonaqueous electrolyte secondary battery shown in FIG. 1; and FIG. 7 is a sectional view of a peripheral portion of the safety valve for illustrating an operation of the nonaqueous electrolyte secondary battery shows in FIG. 1.

As shown in FIG. 1, a nonaqueous electrolyte secondary battery 10, which is an embodiment, includes a wound electrode body 11, an anode insulating plate 12, an anode lead 13, a cathode insulating plate 14, a cathode lead 15, a packaging can 16 forming a cathode side of a battery can container, an anode terminal 17 forming an anode side of the battery can container, a PTC element 18, a gasket 19, and a safety valve 20 having a safety cover 21, a stripper disk 22 and a disk holder 23. The nonaqueous electrolyte secondary battery 10 is a lithium ion secondary battery filled with an electrolytic solution(not shown) therein.

The wound electrode body 11 is formed by spirally laminating or winding a belt-shaped anode and a belt-shaped cathode opposed to each other through a separator. The anode is formed such that an anode active material is applied to both surfaces of a 15 µm- to 40 µm-thick aluminum (Al) anode current collector. The anode active material is made of active materials being $LiCoO2$ and $LiMn2O4$, a conductive agent, and a binder. The cathode is formed such that a cathode active material is applied to both surfaces of a 15 µm- to 40 µm-thick cathode current collector made from iron, nickel, nickel-plated iron, copper, or a copper alloy. The cathode active material is made of hard carbon, graphite, and a binder. The separator is formed by using an ion-permeable polyethylene (PE) or polystyrene (PS) microporous film.

The anode insulating plate 12 is assembled to the anode side of the wound electrode body 11, and the anode lead 13 made of aluminum and electrically connected to an end portion on the anode side of the wound electrode body 11 where the anode active material is not applied, is inserted toward the safety valve 20.

The cathode insulating plate 14 is assembled to the cathode side of the wound electrode body 11, and the cathode lead 15 made of nickel and electrically connected to an end portion on the cathode side of the wound electrode body 11 where the cathode active material is not applied, is electrically connected to a bottom portion of the packaging can 16.

The packaging can 16 is formed into a bottomed cylinder by press molding, using conductive nickel-plated iron, stainless steel, or the like, and has an opening on the anode side.

The anode terminal 17 is formed by press molding into a disk with a midsection thereof protruding, using conductive nickel-plated iron, stainless steel, or the like, similarly to the packaging can 16.

The PTC (Positive Temperature Coefficient) element 18 is a composite resistor in which conductive particles such as carbon black are mixed into a polymeric material. The PTC element 18 is disk-shaped with a hole, and is assembled while sandwiched between the anode terminal 17 and the safety cover 21 of the safety valve 20. The PTC element 18 shields current at the time of a short-circuit by its resistance increasing with increasing temperature.

The gasket 19 is a molded product made of a resin, and arranges the anode terminal 17 and the safety valve 20 inside the packaging can 16 under insulation, by the anode terminal 17 and the safety valve 20 being assembled thereinside and the packaging can 16 being thereafter caulked.

The electrolytic solution is prepared using lithium phosphate hexafluoride ($LiPF6$) as a solute, and a nonaqueous solvent, such as ethylenecarbonate (EC), propylenecarbonate (PC), or diethylenecarbonate (DEC), singly or in combination, at concentrations ranging from 0.5 mol/dm3 to 2 mol/dm3.

As shown in FIGS. 4A to 4C and 5A and 5B, the safety valve 20 has the safety cover 21 and the stripper disk 22, and is formed such that the disk holder 23 is outsert-molded into the safety cover 21, and thereafter integrated by housing and fixing the stripper disk therein.

As shown in FIGS. 2A and 2B, the safety cover 21 is formed such that an aluminum (Al) base material is punched into a predetermined shape and thereafter pressed, thereby forming a contact portion 25 protruded at a midsection of a base plate 24, and forming an annular choking protrusion 26 protruded outside the contact portion 25.

Along an inner circumferential portion of the choking protrusion 26, a disconnection preventing member 27 is formed which has an uneven surface that is grooved toward the outer circumference and protruded toward the inner circumference. The choking protrusion 26 is formed annular outside the circumference of the contact portion 25, thereby providing a function of preventing the deformation and positional deviation of the base plate 24 and the contact portion 25. The contact portion 25 is usually in electrical contact with the stripper disk 22 and the anode lead 13.

In the safety cover 21, an inside inscription 28 for controlling a breaking pressure is annularly grooved in an upper surface of the base plate 24, and an outside inscription 29 for controlling a cleaving pressure is annularly grooved in a lower surface of the base plate 24. The inside inscription 28 has a diameter of, e.g., φ2.6 mm, whereas the outside inscription 29 has a diameter of, e.g., φ8.0 mm.

As shown in FIGS. 3A and 3B, the stripper disk 22 is molded into a disk by punching an aluminum (Al) base material into a predetermined shape. The molded disk has such an outside diameter as to be housed inside the choking protrusion 26 of the safety cover 21 and has a contact insertion hole 30 in a midsection thereof In the stripper disk 22, three communicating holes 31 are formed at equal intervals outside the circumference of the contact insertion hole 30.

Referring next to FIGS. 4A to 4C, a fabrication procedure for the safety valve 20 in the nonaqueous electrolyte secondary battery 10 will be described. It is noted that the description is given only on a peripheral portion of the safety valve 20.

As shown in FIG. 4A, the disk holder 23 is formed using an injection molding method. A melt of any one of insulating thermoplastic resins including polypropylene (PP), polystyrene (PS), polyethylene (PE), and polyethylene terephthalate (PET) is injected into a mold and then cooled to form the disk holder 23 having an annular shape that is substantially Z-shaped as viewed in half cross-section.

In a first step shown in FIG. 4A, the disk holder 23 is outsert-molded into the safety cover 21 so as to be internally fitted into the dropout preventing member 27 of the choking protrusion 26 of the safety cover 21. At this time, the disk holder 23 is fitted into the disconnection preventing member 27, so that the disk holder 23 is not likely to drop out easily, and thus is molded without positional deviation as held in position by the safety cover 21. A flange 32 protrudes in a direction of protrusion of the choking protrusion 26.

As shown in FIG. 4B, in a second step, the stripper disk 22 is internally fitted into the inner circumferential portion of the disk holder 23 from which the flange 32 protrudes in the direction of protrusion of the choking protrusion 26, and the flange 32 of the disk holder 23 is thereafter thermally caulked toward the stripper disk 22.

As shown in FIG. 4C, when the flange 32 is thermally caulked toward the stripper disk 22, the stripper disk 22 is integrally united with the safety cover 21 through the disk holder 23. The safety valve 20 is thus fabricated. Then, the safety cover 21 is internally fitted into the gasket 19 together with the PTC element 18 and the anode terminal 17, and the opening side of the packaging can 16 is caulked inward.

The safety valve 20 is assembled by including the anode terminal 17 and the anode lead 13, both having structures similar to those in anode terminal and anode lead commonly used. However, since the stripper disk 22 is outsert-molded into the safety cover 21 through the disk holder 23 after housed into the inner circumferential side of the choking protrusion 26 of the safety cover 21, the height between the upper surface of the safety cover 21 and the lower surface of the stripper disk 22 is decreased, to make a height L1 (see FIG. 1) between the upper surface of the anode terminal 17 and the lower surface of the anode lead 13 equal to 3.5 mm, which is extremely small, when compared with that in the commonly-used one.

As shown in FIGS. 5A and 5B, the safety valve 20 is configured that the base plate 24 is disposed near the communicating holes 31 of the stripper disk 22 since the stripper disk 22 is housed on the inner circumferential side of the choking protrusion 26 of the safety, cover 21. As a result, an internal pressure is directly applied to the base plate 24 of the safety cover 21 through the communicating holes 31 of the stripper disk 22.

As shown in FIG. 6, in the packaging can 16, the safety cover 21, the PTC element 18, and the anode terminal 17 are caulked through the gasket 19. Then, the packaging can 16, having a small bead portion 33, has a crimp portion 34 caulked at a large angle (e.g., 30 degrees) in a radial direction at an upper end portion of the gasket 19, thereby suppressing the gasket 19 from being relieved and also preventing the crimp portion 34 from slacking.

As shown in FIG. 7, if the nonaqueous electrolyte secondary battery is overcharged, or short-circuited due to erroneous use to cause a large current to flow, the safety valve 20 controls the cleaving pressure as follows, when the electrolytic solution is dissolved to produce a gas to increase the internal pressure in the battery can container surrounded by the packaging can 16 and the anode terminal 17. That is, the midsection of the base plate 24 in the safety cover 21 is deformed toward the anode terminal 17 through the outside inscription 29, or the outside inscription 29 is broken to shield the contact portion 25 from the stripper disk 22 and the anode lead 13. Further, an inner side portion of the base plate 24 which is at the inside inscription 28 is deformed through the inside inscription 28 as the internal pressure fluctuates, thereby controlling the breaking pressure.

EXAMPLE

Next, an example carried out for verifying advantages of the nonaqueous electrolyte secondary battery 10 according to an embodiment of the present invention will be described.

(Measurement of Battery Capacities)

As a comparative example, a nonaqueous electrolyte secondary battery having a height of 4.3 mm from the upper surface of the anode terminal to the lower surface of the anode lead was prepared. Then, battery capacities were measured.

TABLE 1

|  | COMPARATIVE EXAMPLE | EXAMPLE |
| --- | --- | --- |
| HEIGHT BETWEEN ANODE TERMINAL UPPER SURFACE AND ANODE LEAD LOWER SURFACE (mm) | 4.3 | 3.5 |
| BATTERY CAPACITY (mAh) | 2500 | 2535 |

As is apparent from Table 1, the nonaqueous electrolyte secondary battery according to the comparative example exhibited a battery capacity of 2500 mAh, whereas the nonaqueous electrolyte secondary, battery 10 according to the embodiment exhibited 2535 mAh, showing that the battery capacity can be increased by 35 mAh, or 20%. This is accounted for by the fact that the safety valve 20 of the nonaqueous electrolyte secondary battery 10 is formed such that the safety cover 21 accommodates the stripper disk 22 therein, and the stripper disk 22 is fixed and integrated With the disk holder 23.

As described in the foregoing, in nonaqueous electrolyte secondary battery 10, the safety valve 20 is formed by housing the annular-shaped stripper disk 22 in the annular-shaped safety cover 21, and by fixing and integrating the stripper disk 22 with the annular-shaped disk holder 23. As a result, the stripper disk 22 is fit into the height of the safety cover 21, decreasing the height between the upper surface of the safety cover 21 and the lower surface of the stripper disk 22 to increase the internal volume of the battery without changing the total height of the battery. Hence, it is possible to provide a higher capacity of the battery.

Furthermore, in the nonaqueous electrolyte secondary battery 10, the safety cover 21 can be accurately positioned within the mold dies when the disk holder 23 is integrally molded with the safety cover 21, thereby allowing the disk holder 23 to be integrally molded without positional deviation.

Furthermore, in the nonaqueous electrolyte secondary batter, 10, if the nonaqueous electrolyte secondary battery is overcharged, or short-circuited due to erroneous use to cause a large current to flow, the cleaving pressure can be controlled by the base plate 24 of the safety cover 21 being deformed or cut through the outside inscription 29, and the breaking pressure can be controlled by the base plate 24 of the safety cover 21 being deformed through the inside inscription 28, when the electrolytic solution is dissolved to produce a gas to increase the internal pressure in the batter, can container.

Furthermore, according to the nonaqueous electrolyte secondary battery 10, the disk holder 23 fixes the stripper disk 22 to the safety cover 21 by housing the stripper disk 22 in the safety cover 21 and then outsert-molding the thermoplastic resin. As a result, the disk holder 23 can fix the safety cover 21 and the stripper disk 22 with their dimensional errors absorbed.

Furthermore, according to the nonaqueous electrolyte secondary battery 10, the thermoplastic resin for the disk holder 23 is any of polypropylene (PP), polystyrene (PS), polyethylene (PE), and polyethylene terephthalate (PET). Accordingly, simple molding can be performed using an insulating, relatively inexpensive resin material.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte secondary battery comprising:
   a battery can container which houses a wound electrode body formed by winding a belt-shaped anode and cathode, and isolated by a separator together with an electrolytic solution;
   an anode terminal fixed to the battery can container through a gasket; and
   a safety valve incorporated between the anode terminal and the wound electrode body, wherein the safety cover is formed with an annular-shaped protrusion for housing the disk holder therein, and the protrusion has a disconnection preventing portion for preventing disconnection of the disk holder,
   wherein the safety valve includes:
   an annular-shaped safety cover;
   an annular-shaped stripper disk; and
   an annular-shaped disk holder which houses the annular-shaped stripper disk in the annular-shaped safety cover, the annular-shaped stripper disk and the annular-shaped safety cover being fixed and integrated.

2. The nonaqueous electrolyte secondary battery according to claim 1, wherein the safety cover is further formed with an outside inscription for controlling a cleaving pressure and an inside inscription for controlling a breaking pressure.

3. The nonaqueous electrolyte secondary battery according to claim 1, wherein the disk holder is formed by outsert-molding a thermoplastic resin.

4. The nonaqueous electrolyte secondary battery according to claim 3, wherein the thermoplastic resin for the disk holder is any one of polypropylene, polystyrene, polyethylene, and polyethylene terephthalate.

5. The nonaqueous electrolyte secondary battery according to claim 1, wherein the safety cover is formed by punching an aluminum base material into a predetermined shape and thereafter performing press working of the punched aluminum base material.

6. The nonaqueous electrolyte secondary battery according to claim 1, wherein the dropout preventing portion has an uneven surface which is grooved toward an outer circumference and protruded toward an inner circumference, along an inner circumferential portion of the protrusion.

7. The nonaqueous electrolyte secondary battery according to claim 1, wherein the stripper disk is formed by punching an aluminum base material into a predetermined shape, has such an outside diameter as to be housed inside a choking protrusion of the safety cover, and is molded into a disk having a contact insertion hole in a midsection thereof.

8. The nonaqueous electrolyte secondary battery according to claim 7, wherein the stripper disk has a plurality of communicating holes formed at equal intervals outside a circumference of the contact insertion hole.

9. The nonaqueous electrolyte secondary battery according to claim 1, wherein the disk holder is formed into an annular shape which is substantially Z-shaped as viewed in half cross-section.

10. A nonaqueous electrolyte secondary battery comprising:
    a battery can container which houses a wound electrode body formed by winding a belt-shaped anode and cathode, and isolated by a separator together with an electrolytic solution;
    an anode terminal fixed to the battery can container through a gasket; and
    a safety valve incorporated between the anode terminal and the wound electrode body,
    wherein the safety valve includes:
    an annular-shaped safety cover;
    an annular-shaped stripper disk,
    an annular-shaped disk holder which houses the annular-shaped stripper disk in the annular-shaped safety cover, the annular-shaped stripper disk and the annular-shaped safety cover being fixed and integrated; and
    wherein the disk holder is formed by outsert-molding a thermoplastic resin wherein:
    the disk holder is outsert-molded so as to be internally fitted into the dropout preventing portion of the choking protrusion of the safety cover, and
    a flange of the disk holder protrudes toward a direction of protrusion of the choking protrusion of the safety cover.

11. The nonaqueous electrolyte secondary battery according to claim 10, wherein:
    the stripper disk is internally fitted into an inner circumferential portion of the disk holder, and
    the flange of the disk holder is caulked toward the stripper disk.

* * * * *